United States Patent
Bormann et al.

(10) Patent No.: US 6,664,985 B1
(45) Date of Patent: *Dec. 16, 2003

(54) METHOD AND APPARATUS FOR SUPERVISING A PROCESSOR WITHIN A DISTRIBUTED PLATFORM SWITCH THROUGH GRAPHICAL REPRESENTATIONS

(75) Inventors: Richard J. Bormann, Howell, NJ (US); Ann C. Fulop, Bloomington, IL (US); Steven J. Shute, Yardley, PA (US); Radakichenane Vengatatry, Edison, NJ (US); Phillip A. Weeks, Little Silver, NJ (US)

(73) Assignee: AT&T Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/986,220

(22) Filed: Dec. 5, 1997

Related U.S. Application Data

(60) Provisional application No. 60/051,568, filed on Jul. 2, 1997.

(51) Int. Cl.[7] ............................. G06F 11/32; G09G 5/00
(52) U.S. Cl. ....................... 345/835; 345/969; 345/970; 709/223; 709/224
(58) Field of Search .............................. 345/349, 333, 345/334, 356, 357, 347, 961, 969, 970; 395/200.51, 200.52, 200.53, 500.54, 500.5; 709/221, 222, 223, 224

(56) References Cited

U.S. PATENT DOCUMENTS

| | | | | |
|---|---|---|---|---|
| 5,049,873 A | * | 9/1991 | Robins et al. | 340/825.06 |
| 5,226,120 A | | 7/1993 | Brown et al. | 395/200 |
| 5,261,044 A | | 11/1993 | Dev et al. | 395/159 |
| 5,285,494 A | | 2/1994 | Sprecher et al. | 455/423 |
| 5,295,244 A | | 3/1994 | Dev et al. | 395/161 |
| 5,394,522 A | | 2/1995 | Sanchez-Frank et al. | 395/159 |
| 5,483,631 A | | 1/1996 | Nagai et al. | 395/155 |
| 5,521,913 A | | 5/1996 | Gridley | 370/58.2 |
| 5,548,722 A | | 8/1996 | Jalalian et al. | 395/200.1 |
| 5,606,664 A | | 2/1997 | Brown et al. | 395/200.54 |
| 5,627,964 A | | 5/1997 | Reynolds et al. | 395/183.22 |
| 5,627,978 A | | 5/1997 | Altom et al. | 345/330 |
| 5,724,511 A | * | 3/1998 | Moritomo | 395/200.75 |
| 5,751,965 A | | 5/1998 | Mayo et al. | 395/200.54 |
| 5,768,614 A | | 6/1998 | Takagi et al. | 395/821 |
| 5,793,845 A | | 8/1998 | Hollywood et al. | 379/88 |
| 5,819,042 A | | 10/1998 | Hansen | 395/200.52 |

* cited by examiner

*Primary Examiner*—Raymond J. Bayerl
*Assistant Examiner*—Cuong T. Thai
(74) *Attorney, Agent, or Firm*—Kenyon & Kenyon

(57) ABSTRACT

Supervising a distributed switch having a set of interconnected distributed switch processors each having its own set of components. State information about a distributed switch processor from the set of distributed switch processors is received. A graphical user interface (GUI) having a set of glyphs within one output unit is displayed. Each glyph from the set of glyphs representing a component of the distributed switch processor. Each glyph from the set indicates the state information about its own component.

24 Claims, 6 Drawing Sheets

FIG. 1

| TOWNSTBLSUB | 4E<20>15.r1 | MUP | PORT 0 | PAGE 100 | 10/25/94 | 22:14:43 |
|---|---|---|---|---|---|---|
| CRITICAL | MAJOR | MINOR | SDC | PGM CTRL | PWR/BLDG | SYS NORM |
| CC | PS | CS | IF/AU | PU | MISC | MCC DPFL |

CMD:

-4ESS MASTER CONTROL COMPLEX PAGE INDEX-

EA DISP — EMERGENCY ACTION INTERFACE

100 — PAGE INDEX

106 — MUP STATUS AND CONTROL

108 — SYSTEM STATUS

109 — PROGRAM STORE STATUS AND CONTROL

110 — CALL STORE STATUS AND CONTROL

118 — 1B PROCESSOR STATUS

119 — DDI KEY OPTIONS

120 — DATA DISPLAY

1990 — DEAD START

FIG. 2

| TOWNSTBLSUB | 4E<20>15.r1 | MUP | PORT 0 | PAGE 108 | 10/25/94 | 22:14:43 |

| CRITICAL | MAJOR | MINOR | | SDC | PGM CTRL | | MCC | SYS NORM |
| CC | PS | CS | | IF/AU | PU | | PWR/BLDG MISC | |

CMD:

-SYSTEM ACTIVITY-
BASE CYCLE TIME          0009 ms
TRAFFIC INCOMING         0000 K
SWITCH INEF ATMPT        00 %
EQUIP INEF ATMPT         00 %
NO. CALLS CMPLTD         0000 K
INTERRUPTS               0000
AUDITS                   6377

=INTERRUPT=

-SYSTEM STATUS-
=DGN IN PROG=        =FREE RUN=
-ALARMS-
810 - SDC
811 - PGM CNTL OFF NORM
812 - OVLD CTL IN EFF
813 - INTRPT INH
814 - REFSTAT

-SYSTEM CONTROLS-
801 - RESTRICT RC
802 - INH SUP PRINT
803 - INH INT PRINT
804 - INH AUD PRINT
805 - ELEV AUD PRINT
806 - REINIT TTY SYS
807 - REQ TTY AUDIT
808 - CLEAR INTERRUPTS

809 - OP:OOSUNITS (ALL)

-PROCESSOR EQUIPMENT STATUS-
820 - CC    826 - IFB    832 - APS    838 - PCD
821 - PSB   827 - AUI    833 - API    839 - XPWR
822 - CSB   828 - SSD    834 - DUS
823 - PS    829 - MUP    835 - TUC
824 - CS    830 - IDUS   836 - AUB
825 - FC    831 - IOUC   837 - PUB

-PERIPHERAL EQUIPMENT STATUS-
850 - TMSP   856 - DT    862 - TGR
851 - TSI    857 - DIF   863 - SLNK
852 - NCLK   858 - VIF   864 - VFL
853 - NCSU   859 - EST   865 - R&T
854 - SCLK   860 - SCS   866 - SYC
855 - SP     861 - RA

[P]revious   [ESC] Exit   [H]elp   Enter

METHOD AND APPARATUS FOR SUPERVISING A PROCESSOR WITHIN A DISTRIBUTED PLATFORM SWITCH THROUGH GRAPHICAL REPRESENTATIONS

CROSS-REFERENCE TO A RELATED PATENT APPLICATIONS

This patent application claims the benefit of U.S. Provisional Application No. 60/051,568 entitled Graphical User Interfaces and Reusable Java Components For Use With A Distributed Platform Switch, filed on Jul. 2, 1997.

This patent application is related to the following commonly assigned U.S. Patent applications with the same inventors: A Method And Apparatus For Using A Graphical User Interface (GUI) As the Interface To A Distributed Platform Switch, Ser. No. 08/985,862, filed Dec. 5, 1997, now pending; A Method And Apparatus For Supervising A Distributed Platform Switch Through Graphical Representations, Ser. No. 08/985,866, filed Dec. 5, 1997, now pending; Reusable Software Components For A Graphical User Interface for a Distributed Platform Switch, Ser. No. 08/985,775, filed Dec. 5, 1997, now pending; A Reusable Light-Emitting Diode Canvas Software Component For A Graphical User Interface, Ser. No. 08/986,219, filed Dec. 5, 1997, now pending; A Reusable Sparing Cell Software Component For A Graphical User Interface, Ser. No. 08/986,218, filed Dec. 5, 1997, now pending; and A Reusable Reversible Progress Indicator Software Component For A Graphical User Interface, Ser. No. 08/985,865, filed Dec. 5, 1997, now pending.

FIELD OF THE INVENTION

The present invention generally relates to the field of distributed computing and the field of telecommunications. Specifically, the present invention relates to supervising a distributed platform switch through graphical representations with a graphical user interface (GUI).

BACKGROUND

Traditionally, telecommunications switches have been represented and maintained through the use of one or more switch-maintenance tools using character-based computer interfaces. Because single-processor switch architectures are being replaced with distributed multi-processor switch architectures, switch-maintenance computer tools using character-based interfaces are particularly problematic. These distributed multi-processor switch architectures can have, for example, processors or processor groups taking on specialized functions having high-speed interconnections. Character-based switch-maintenance interfaces cannot effectively represent the added complexity of these distributed multi-processor switch architectures.

For example, FIG. 1 shows a main screen of a known character-based switch-maintenance interface for a non-distributed communications switch. The main screen shown in FIG. 1 provides alarm information about the switch by setting background color of the alarm fields to red. As shown in FIG. 1, the "CRITICAL" and "MAJOR" fields have a red background color.

By selecting a series of multiple-character commands, the maintenance operator can view additional switch information on a separate screen. For example, FIG. 2 shows a screen having the additional information for a non-distributed communications switch from the known character-based switch-maintenance interface. As shown in FIG. 2, the alarm information of the switch processor equipment is displayed in the lower left portion of the screen. The alarm information of the switch processor equipment is conveyed through the background color, text color and text.

This known character-based switch-maintenance interface, however, suffers several shortcomings. First, this known character-based interface does not provide any information on how the switch processor equipment is physically arranged within the switch processor cabinet. For example, as shown in FIG. 2, the switch processor equipment is merely listed in the lower left portion of the character-based interface; the character-based interface does not provide any information on the physical arrangement of the switch processor equipment. The maintenance operator must rely on personal memory and/or access additional resources (e.g., manuals) to determine the physical arrangement of alarming switch processor equipment within its cabinet.

Second, this known character-based interface requires the maintenance operator to enter a series of character-based commands which include an equipment identifier to perform maintenance to that particular piece of switch processor equipment. Such a procedure wastes time, requires additional training of the maintenance operator and leaves room for error by the maintenance operator.

Finally, this known character-based interface requires the maintenance operator to page through multiple output screens to obtain all of the appropriate information required to properly perform maintenance. For example, the output screen illustrated by FIG. 1 indicates to the maintenance operator that an alarm has occurred, and the output screen illustrated by FIG. 2 indicates in which piece of switching equipment the alarm has occurred; finally, the maintenance operator must return to the output screen illustrated by FIG. 1 to input character-based commands using the information provided by the output screen of FIG. 2. Of course, because the appropriate information is located on various multiple output screens, the maintenance operator performing maintenance can make errors when attempting to compile and to act upon the appropriate information.

SUMMARY OF THE INVENTION

The present invention uses glyphs to provide status and alarm information on distributed switch processor components so that the physical arrangement of the components is displayed to the maintenance operator. A glyph is a picture-based representation which conveys meaning to the observer.

The present invention allows the maintenance operator to select and act on one or more glyphs to perform maintenance on the distributed switch processor component corresponding to the selected glyphs.

The present invention provides appropriate information to the maintenance operator in such a manner that the maintenance operator can concurrently view all of the appropriate information.

The present invention increases efficiency of the maintenance process, reduces the amount of training required for the maintenance operator, and reduces the possibility of maintenance operator error.

A distributed switch having a set of interconnected distributed switch processors each having a set of components is supervised using a graphical user interface (GUI). State information about a distributed switch processor from the set of distributed switch processors is received. A GUI having a set of glyphs within one output unit is displayed. The output unit can be a single GUI window. Each glyph from the set represents a component of the distributed switch processor. Each glyph from the set indicates the state information about its own component.

The arrangement of the set of glyphs displayed can correspond to a physical layout of the components of the distributed switch processor. A technician located with the physical hardware occasionally needs to perform maintenance on the physical hardware from either the front or the back of the physical hardware cabinet. The arrangement of the plurality of glyphs displayed in the GUI can correspond to a front physical layout of the components of the distributed switch processor within a front of a cabinet containing the components. The arrangement of the plurality of glyphs displayed in the GUI can correspond to a back physical layout of the components of the distributed switch processor within a back of the cabinet containing the components. The front physical layout and the back physical layout can be displayed within a single output unit.

The state information can include an alarm severity and an operational state. Each glyph from the set of glyphs can include a color indicating an alarm severity and a text indicating an operational state. Each glyph from the set of glyphs that corresponds to the same alarm severity includes the same color.

Updated state information about the distributed processor can be received. The GUI can be displayed so that each glyph from the set of glyphs can indicate the updated state information about its own component.

BRIEF DESCRIPTION OF THE DRAWINGS

FIG. 1 shows a main screen of a known character-based computer maintenance tool for a non-distributed communications switch.

FIG. 2 shows a screen having the additional information for a known character-based switch-maintenance interface for a non-distributed communications switch.

DETAILED DESCRIPTION

Figure 3:
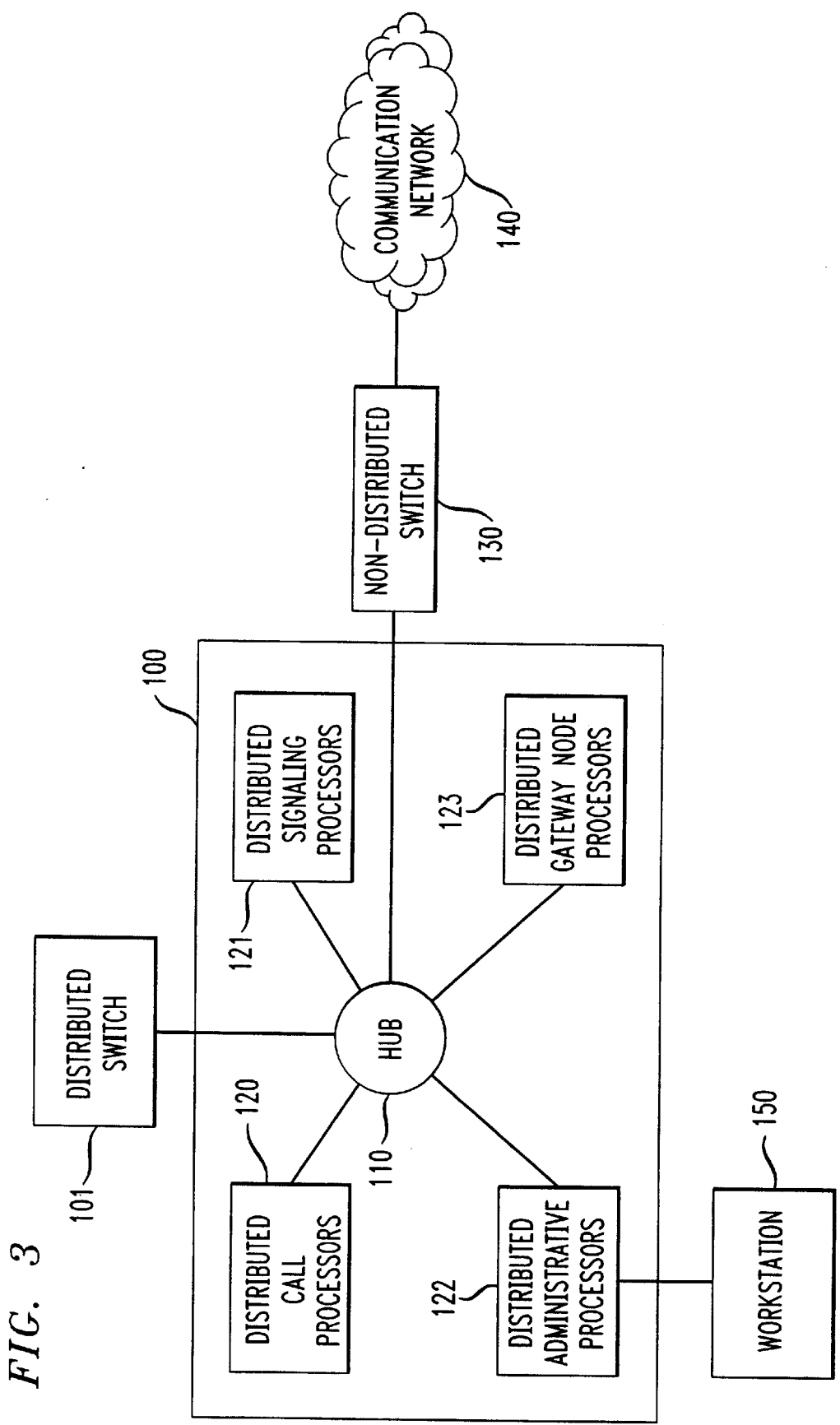
FIG. 3 shows a network of distributed processors as an exemplary system configuration for which embodiments of the present invention can be used.

FIG. 3 shows a network of distributed processors as an exemplary system configuration for which embodiments of the present invention can be used. FIG. 3 is for illustrative purposes only and in no way limits the type of system configurations within which embodiments of the present invention can be used. Distributed switch 100 comprises hub 110, distributed call processors 120, distributed signaling processors 121, distributed administration processors 122, and distributed gateway node processors 123. Hub 110 connects distributed processors 120 through 123. Hub 110 also connects distributed switch 100 to non-distributed switch 130. Non-distributed switch 130 is connected to communications network 140. Distributed switch 100 can also be connected to another distributed switch, such as distributed switch 101. Workstation 150 is connected to one administrative processor from distributed administrative processors 122. In the example shown in FIG. 3, a processor from distributed administration processors 122 can act as the local processor and workstation 150 can act as the remote processor. The commonly assigned patent application Ser. No. 08/985,862 entitled A METHOD AND APPARATUS FOR USING A GRAPHICAL USER INTERFACE (GUI) AS THE INTERFACE TO A DISTRIBUTED PLATFORM SWITCH provides a further description of the exemplary system configuration of the distributed switch shown in FIG. 2 and is incorporated by reference herein.

Figure 4:
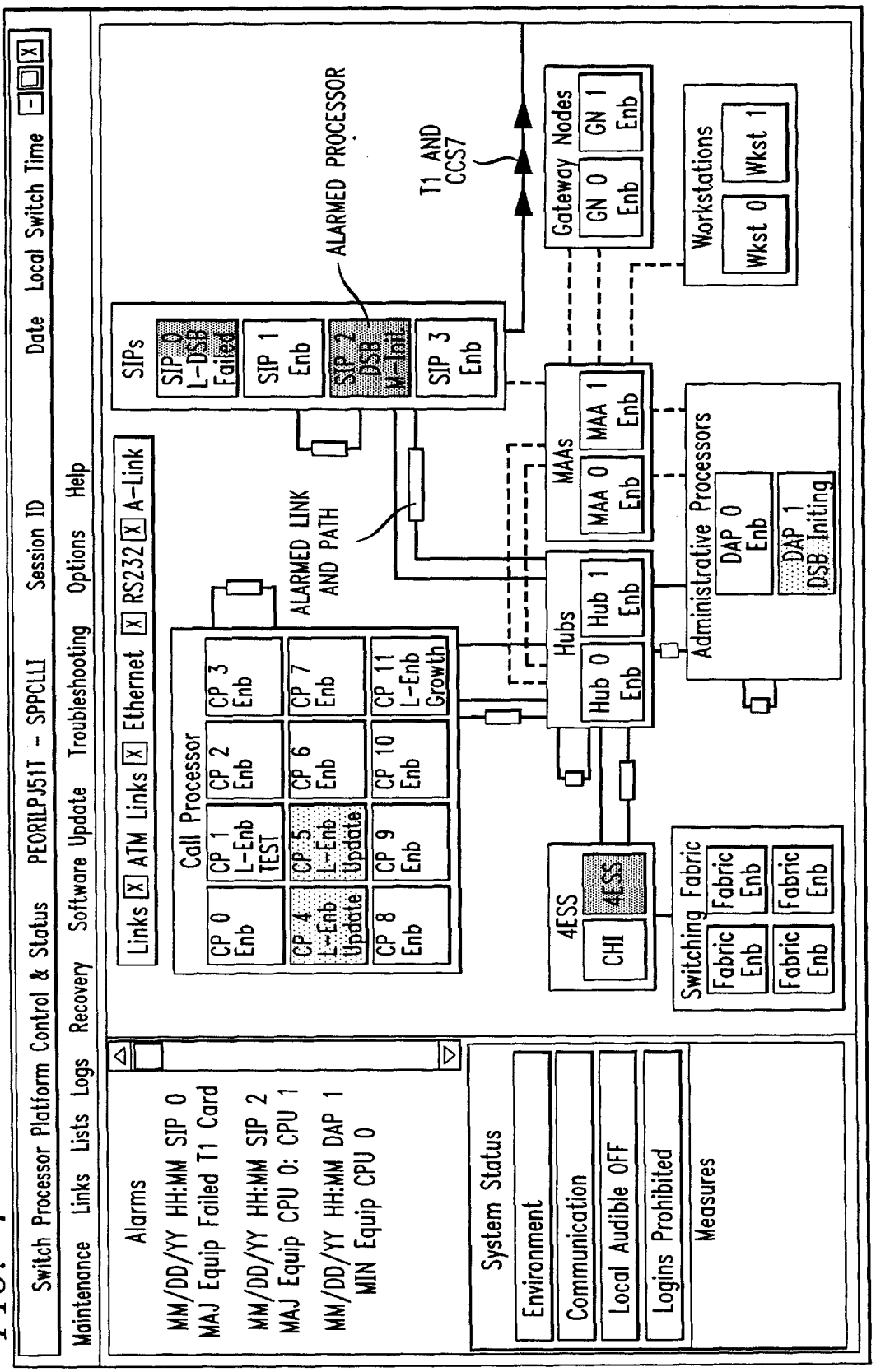
FIG. 4 shows a main window of a graphical user interface (GUI) showing state information about the elements within a distributed switch, according to an embodiment of the present invention.

FIG. 4 shows a main window of a graphical user interface (GUI) showing state information about the elements within a distributed switch, according to an embodiment of the present invention. State information can include alarm information, status information, operational information and administrative information. The main window shown in FIG. 4 has four sections: in the left top section is the alarm summary list, the left middle section is the overall system status list, the bottom left portion is the overall switch measures list, and the right section is the graphic section.

The graphic section of the main window shows graphic representations of the switch elements. Specifically, each switch element including the distributed switch processors and their interconnections are represented by a glyph, i.e., a picture-based representation which conveys meaning to the observer. Each glyph representing a switch element can provide several types of state information. The commonly assigned patent application Ser. No. 08/985,866 entitled A METHOD AND APPARATUS FOR SUPERVISING A DISTRIBUTED PLATFORM SWITCH THROUGH GRAPHICAL REPRESENTATIONS provides a further description of the exemplary GUI main window shown in FIG. 4 and is incorporated by reference herein.

Figure 5:
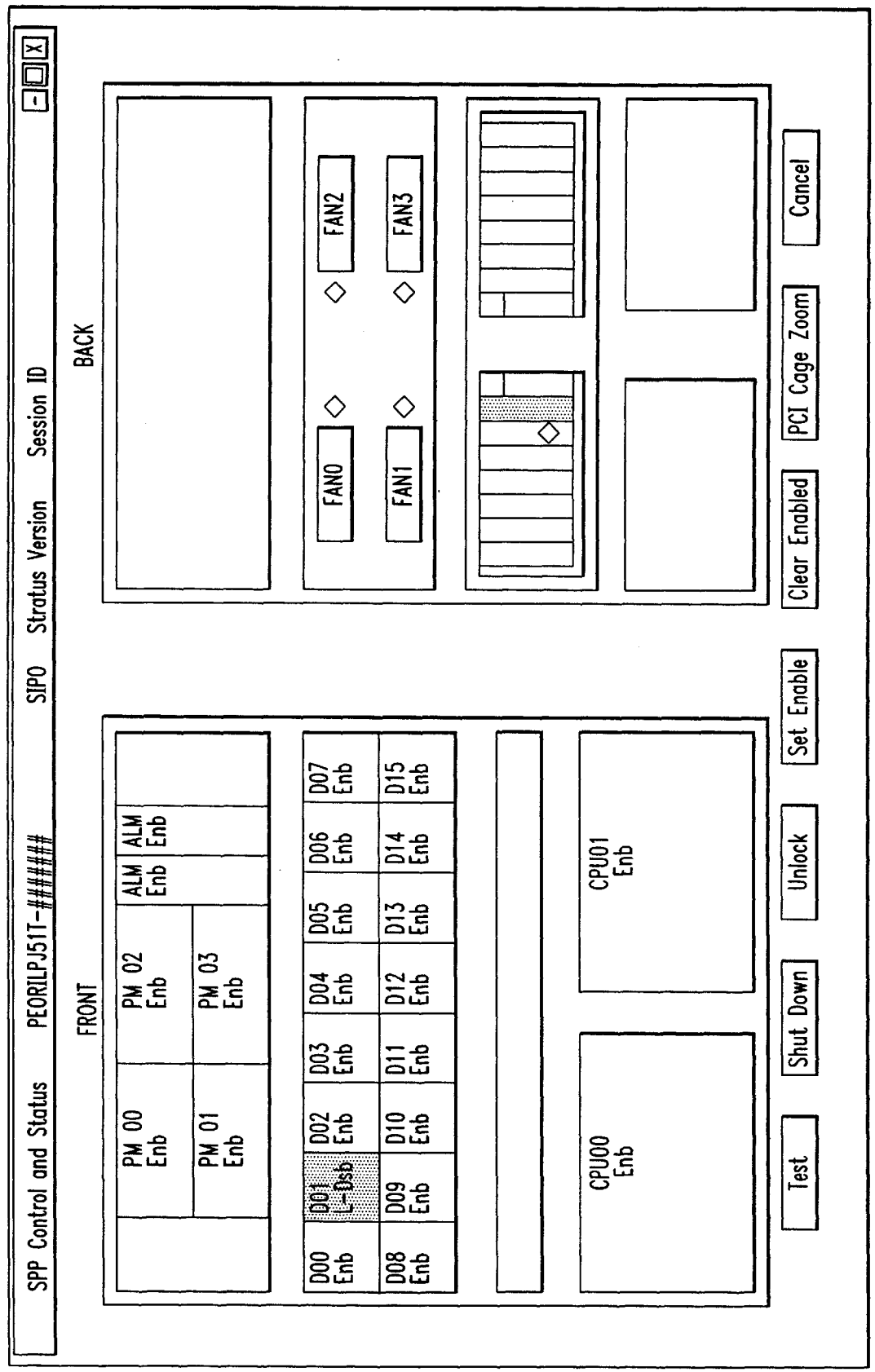
FIG. 5 shows an example of a secondary window of a GUI showing state information for a component of a distributed switch processor, according to an embodiment of the present invention.
Figure 6:
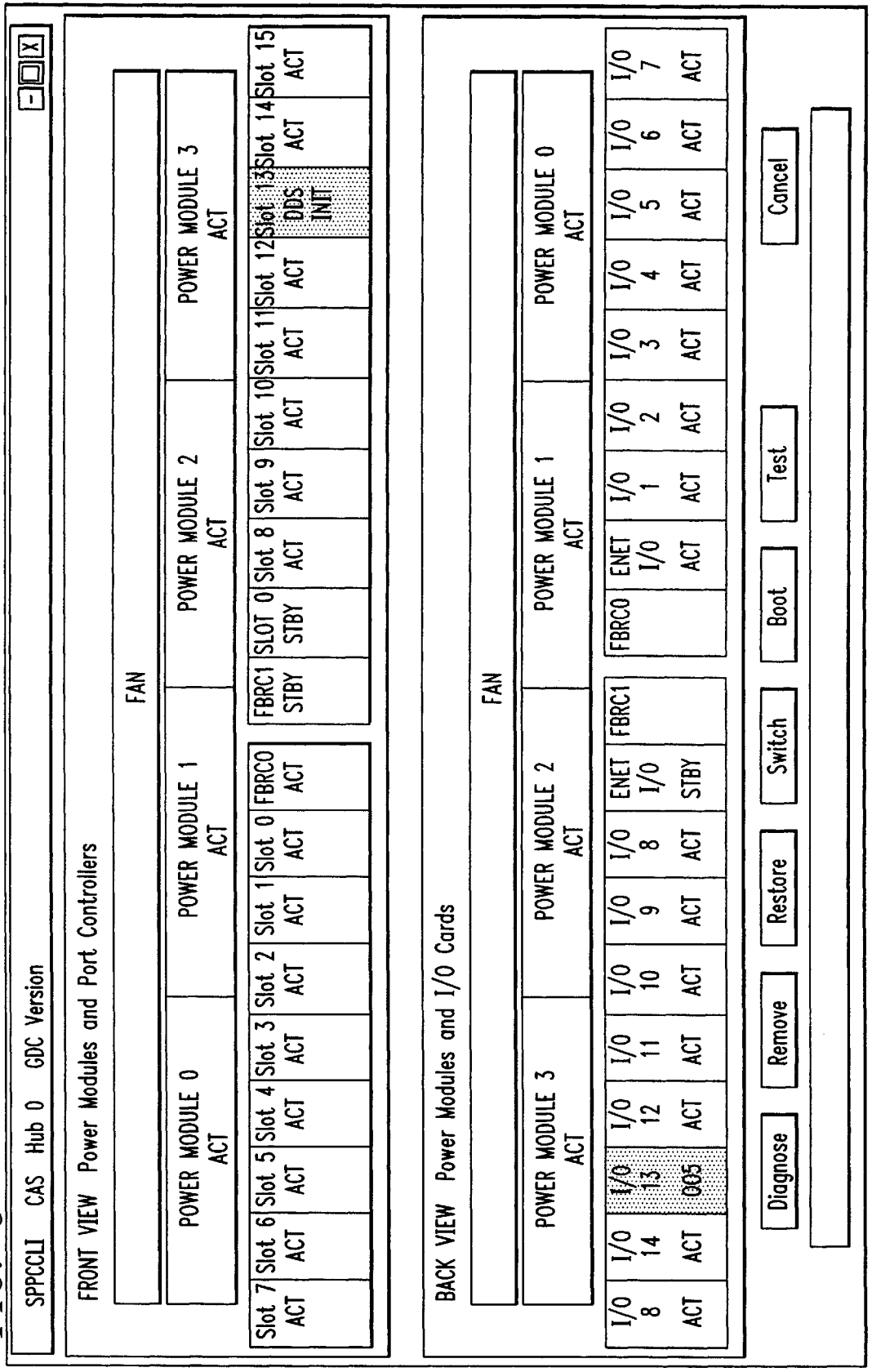
FIG. 6 shows another example of a secondary window of a GUI showing state information for another component of a distributed switch processor, according to an embodiment of the present invention.

Using a pointing device or a mouse connected to workstation 150, a maintenance operator can double click a glyph representing a distributed switch processor to open a secondary window showing state information about that distributed switch processor component. FIG. 5 shows an example of a secondary window of a GUI showing state information for a component of a distributed switch processor, according to an embodiment of the present invention. FIG. 6 shows another example of a secondary window of a GUI showing state information for another component of a distributed switch processor, according to an embodiment of the present invention.

Alarm Information

The glyphs representing distributed switch processor components can indicate alarm information. Specifically, the glyphs can indicate which distributed switch processor components are alarming, the severity of the alarms and the operational condition of the switch. The glyphs that represent the distributed switch processor components highlight the appearance of alarms and quickly direct the maintenance personnel's attention to potential problem areas. Because each distributed switch processor component has a corresponding glyph, a glyph showing an alarm quickly indicates the corresponding distributed switch processor component experiencing the alarm. The severity of the alarms are indicated by the colors of the glyph.

For example, a distributed switch processor component experiencing a minor alarm can have its corresponding glyph display a color of yellow. A distributed switch processor component experiencing a major alarm can have its corresponding glyph display the color of red. Finally, a distributed switch processor component experiencing a critical alarm can have its corresponding glyph display a flashing red color. For example, as shown in FIG. 5, the distributed switch processor component having the corresponding glyph labeled "D 01" has a major alarm as indicated by the red color of that glyph.

Status Information

Each glyph that represents a distributed switch processor component can provide operational, administrative, status and activity information to help maintenance personnel assess the cause of the alarm.

Each glyph can contain three lines of text. The first line of text can indicate the identifier for the corresponding distributed switch processor component. The operational state of the distributor switch processor components can be displayed on the second line of text. For example, "ENB" can indicate that the distributed switch processor component is enabled and "DSB" can indicate that the distributed switch processor component is disabled; see, for example, FIGS. 5 and 6.

Information regarding the administrative state of the distributed switch processor component also can be provided in the second line of text. The administrative information can indicate whether the distributed switch processor component is providing service or not providing service. The administrative state of the distributed switch processor component can be indicated in the second line of text by including an L indicating whether the element is locked (i.e., not providing service). Thus, the operational information and administrative information can be contained in the same second line of text for a particular glyph.

The status of the distributed switch processor components within the distributed switch processor components can be indicated by a third line of text within the glyph. Specifically, the status of the distributed switch processor component can include the following status types: new equipment is being added ("Growth"), standby ("Standby"), failed ("Failed"), powered off ("PWROFF"), manual initialization is required ("M-init"), overloaded ("OVLD"), automatic fault recovery is inhibited ("inhb").

The third line of text within the glyph can also indicate the activities occurring within the distributed switch processor components. The activities of the distributed switch processor component can include the following activity types: shutting down ("SHDN"), being tested ("Test"), being switched from active to standby ("Switch"), initializing ("Initing"), and being rebooted ("Booting").

In the case where more than one status type and/or activity type is associated with the same glyph, the third line of text within the glyph can have the label "MORE." The maintenance operator can then single right click the glyph to open a window-displaying the more than one status type and/or activity type. Note that situations can exist where at least one status type and at least one activity type are applied to the same glyph.

Overall Distributed Switch Processor Information

The secondary window of the GUI can indicate the physical layout of the distributed switch processor components within the cabinet where the components are located. In other words, the glyphs representing distributed switch processor components can be arranged to correspond to the physical layout of the components of the distributed switch processor. Consequently, the maintenance operator viewing the displayed secondary window of the GUI can observe the status and alarm information for the distributed switch processor components in correspondence to their physical arrangements. The physical arrangements can include a front view and/or a back view as would be seen by a technician viewing the components through an open front and/or back processor cabinet door, respectively.

For example, as shown in FIG. 5, the left half of the GUI window corresponds to the physical layout of the front of the distributed switch processor within its cabinet; the right half of the GUI window corresponds to the physical layout of the back of the distributed switch processor. As shown in FIG. 6, the top half of the GUI window corresponds to the physical layout of the front of the distributed switch processor within its cabinet; the bottom half of the GUI window corresponds to the physical layout of the back of the distributed switch processor.

The secondary window of the GUI displays all of the distributed switch processor components within a single window. Maintenance operators can view within a single window, for example, the number of fans, disks, input/output cards and central processing units (CPUs) within a distributed switch processor cabinet.

Note that a maintenance operator can open and concurrently view the secondary window of the GUI corresponding to a particular distributed switch processor with other windows, such as the main window or another secondary window corresponding to another distributed switch processor component. Consequently, the maintenance operator can view, via the multiple windows, all the information needed to perform maintenance tasks on the distributed switch and/or a distributed switch processor.

Conclusion

In conclusion, a maintenance operator can view the graphical representation of the distributed switch processor components from a single GUI window. The main window of the GUI can display the overview of all distributed switch processors; from this window, a maintenance operator can open multiple secondary windows displaying the graphical representation of the distributed switch processor components. The main window and the secondary windows displaying the distributed switch processor components can be displayed concurrently within the same output screen. The maintenance operator can view the appropriate information to perform maintenance on the distributed switch processor components.

It should, of course, be understood that while the present invention has been described in reference to particular system components and GUI configurations, other system configurations and GUI configurations should be apparent to those of ordinary skill in the art. For example, although the distributed switch is shown with a hub-interconnection configuration, other configurations such as star or loop configurations are possible.

What is claimed is:

1. A method for supervising a distributed switch having a plurality of interconnected distributed switch processors each having its own plurality of components, comprising the steps of:

(a) receiving state information about a distributed switch processor from the plurality of distributed switch processors; and (b) displaying a graphical user interface (GUI) having a plurality of glyphs within a single output unit, each glyph from the plurality of glyphs representing a component of the distributed switch processor, each glyph from the plurality of glyphs indicating the state information about its own component;

wherein a first arrangement of the plurality of glyphs displayed in said displaying step (b) correspond to a front physical layout of the components of the distributed switch processor within a front of a cabinet containing the components, a second arrangement of the plurality of glyphs displayed in said displaying step (b) correspond to a back physical layout of the components of the distributed switch processor within a back of the cabinet containing the components, and the front physical layout and the back physical layout are displayed in said displaying step (b) within said single output unit.

2. The method of claim 1, wherein the state information includes an alarm severity and an operational state.

3. The method of claim 1, wherein each glyph from the plurality of glyphs includes a color indicating an alarm severity and a text indicating an operational state.

4. The method of claim 3, wherein each glyph from the plurality of glyphs that corresponds to the same alarm severity includes the same color.

5. The method of claim 1, further comprising the steps of:
   (c) receiving updated state information about the distributed processor; and
   (d) displaying the GUI so that each glyph from the plurality of glyphs indicates the updated state information about its own component.

6. The method of claim 1, wherein the single output unit is a single GUI window.

7. The method of claim 1, wherein the front physical layout is displayed on either a left or right half of said single output unit and the back physical layout is displayed on said single output unit on the half opposite to the displayed front physical layout.

8. The method of claim 1, wherein the front physical layout is displayed on either a left or right half of said single output unit and the back physical layout is displayed on said single output unit on the half opposite to the displayed front physical layout.

9. An article of manufacture, comprising:
   a computer-readable memory having stored thereon a plurality of instructions for supervising a distributed switch having a plurality of interconnected distributed switch processors each having its own plurality of components, the instructions which, when executed by a processor, cause the processor to:
   (a) receive state information about a distributed switch processor from the plurality of distributed switch processors; and
   (b) display a graphical user interface (GUI) having a plurality of glyphs within a single output unit, each glyph from the plurality of glyphs representing a component of the distributed switch processor, each glyph from the plurality of glyphs indicating the state information about its own component;

wherein a first arrangement of the plurality of glyphs displayed in said displaying step (b) correspond to a front physical layout of the components of the distributed switch processor within a front of a cabinet containing the components, a second arrangement of the plurality of glyphs displayed in said displaying step (b) correspond to a back physical layout of the components of the distributed switch processor within a back of the cabinet containing the components, and the front physical layout and the back physical layout are displayed in said displaying step (b) within said single output unit.

10. The article of manufacture of claim 9, wherein the state information includes an alarm severity and an operational state.

11. The article of manufacture of claim 9, wherein each glyph from the plurality of glyphs includes a color indicating an alarm severity and a text indicating an operational status.

12. The article of manufacture of claim 11, wherein each glyph from the plurality of glyphs that corresponds to the same alarm severity includes the same color.

13. The article of manufacture of claim 9, wherein the instructions, when executed by the processor, further cause the processor to:
   (c) receive updated state information about the distributed processor; and
   (d) display the GUI so that at least one glyph from the plurality of glyphs indicates the updated state information about its own component.

14. The article of manufacture of claim 9, wherein the single output unit is a single GUI window.

15. The method of claim 9, wherein the front physical layout is displayed on either a left or right half of said single output unit and the back physical layout is displayed on said single output unit on the half opposite to the displayed front physical layout.

16. The method of claim 9, wherein the front physical layout is displayed on either a left or right half of said single output unit and the back physical layout is displayed on said single output unit on the half opposite to the displayed front physical layout.

17. A computer for supervising a distributed switch having a plurality of interconnected distributed switch processors each having its own plurality of components, comprising:
   a computer-readable memory containing:
      (a) a state program receiving state information about a distributed processor from the plurality of distributed processors; and
      (b) a GUI program displaying a graphical user interface (GUI) having a plurality of glyphs within a single output unit, each glyph from the plurality of glyphs representing a component of the distributed switch processor, each glyph from the plurality of glyphs indicating the state information about its own component;

wherein a first arrangement of the plurality of glyphs displayed in said displaying step (b) correspond to a front physical layout of the components of the distributed switch processor within a front of a cabinet containing the components, a second arrangement of the plurality of glyphs displayed in said displaying step (b) correspond to a back physical layout of the components of the distributed switch processor within a back of the cabinet containing the components, and the front physical layout and the back physical layout are displayed in said displaying step (b) within said single output unit; and a processor connected to said computer-readable memory, said processor running the state program and the GUI program.

18. The computer of claim 17, wherein the state information includes an alarm severity and an operational state.

19. The computer of claim 17, wherein each glyph from the plurality of glyphs includes a color indicating an alarm severity and a text indicating an operational status.

20. The computer of claim 19, wherein each glyph from the plurality of glyphs that corresponds to the same alarm severity includes the same color.

21. The computer of claim 17, wherein the instructions, when executed by the processor, further cause the processor to:
   (c) receive updated state information about the distributed processor, and
   (d) display the GUI so that at least one glyph from the plurality of glyphs indicates the updated state information about its own component.

22. The computer of claim 17, wherein the single output unit is a single GUI window.

23. The computer of claim 17, wherein the front physical layout is displayed on either a left or right half of said single output unit and the back physical layout is displayed on said single output unit on the half opposite to the displayed front physical layout.

24. The computer of claim 17, wherein the front physical layout is displayed on either a left or right half of said single output unit and the back physical layout is displayed on said single output unit on the half opposite to the displayed front physical layout.

* * * * *